1,448,853

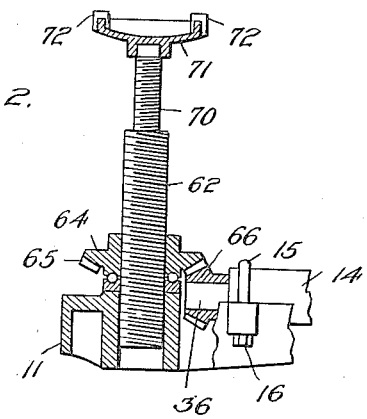
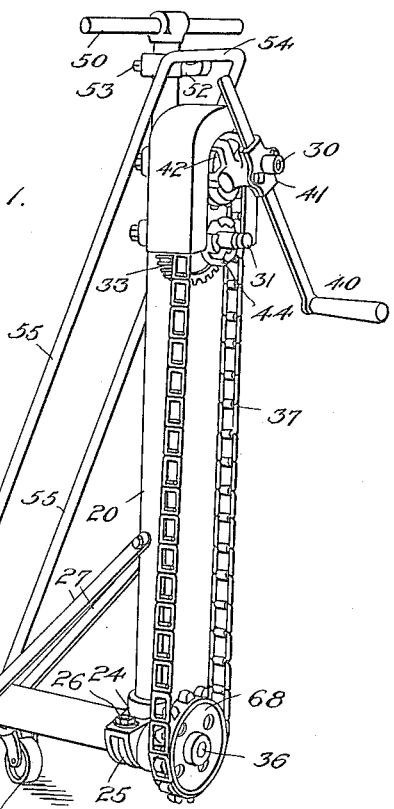
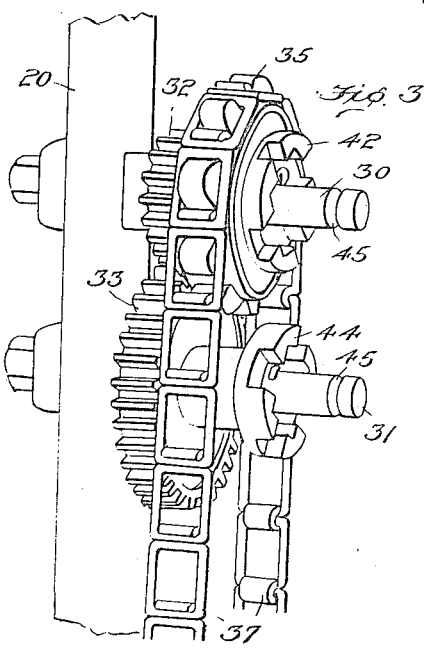
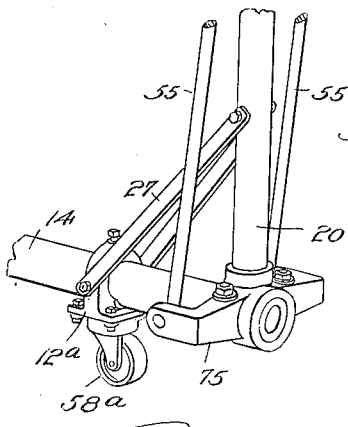
Inventor
Robert E. Manley
By Church & Church
His Attorneys Patented Mar. 20, 1923.

UNITED STATES PATENT OFFICE.

ROBERT E. MANLEY, OF YORK, PENNSYLVANIA.

JACK.

Application filed April 18, 1922. Serial No. 554,671.

*To all whom it may concern:*

Be it known that I, ROBERT E. MANLEY, a citizen of the United States, residing at York, in the county of York and State of Pennsylvania, have invented certain new and useful Improvements in Jacks; and I do hereby declare the following to be a full, clear, and exact description of the same, reference being had to the accompanying drawings, forming part of this specification.

This invention relates to jacks and particularly to the type of jack convenient for use in elevating a portion of an automobile.

The object of the present invention is to provide a simple and efficient jack which may be used in cramped quarters and which may be pushed as well as pulled when it is supporting an automobile. A further object of the present invention is to provide a simple and efficient gearing between the elevating screw and the drive means whereby the latter may be placed so as to afford maximum convenience to the operator.

An important feature of the present invention lies in the ability of the operator to tilt the jack about its front wheels as a fulcrum so as to bring the rear wheels into proper position by a swinging movement instead of having to shift repeatedly forward and backward as with the older devices.

Further objects of the present invention are to provide improved details of construction as for example the simple auxiliary telescoping screw forming part of the elevating means, this increasing the range of the device to a considerable extent without adding materially to its cost or detracting from its simplicity.

In the drawings,—

Figure 1 is a perspective view of my device in its preferred form.

Fig. 2 is a vertical elevation through the lifting means.

Fig. 3 is a perspective of the gearing on the upper portion of the upright.

Fig. 4 is a view of a modification.

The base 10 of the device is formed of a truck 11 and a support 12 connected together by a piece of steel tubing 14 secured to the truck by U-bolts 15 passing through reinforced lugs on the truck and fastened by bolts 16. It is convenient to form the support with an opening to receive the tube and to secure the support 12 in place on the tube by a set screw 18 or similar means so that the support 12 may be secured at any desired distance from the truck 11.

A post or upright 20 preferably formed of steel tubing is threaded into a casting 24 welded to the tube 14 or as shown in Fig. 1 secured to it by means of a U-bolt 25 provided with the usual nuts 26. The type shown in this figure is simple, yet efficient, as there is but little tendency for the post 20 to revolve about the tube 14 as a pivot. Braces 27 connect the support and post in the usual manner.

The post 20 carries a pair of shafts 30 and 31 on which are mounted respectively a small pinion 32 and a gear 33 of approximately twice the diameter of the pinion 32. Integral with or rigidly secured to the pinion 32 is a sprocket wheel 35 which drives the main shaft 36 by means of an endless sprocket chain 37. The handle 40 is adjustably mounted in a socket 41 adapted to fit on either the shaft 30 or 31 at will so as to lock with the clutch 42 on the sprocket wheel 35 or with the similar clutch 44 carried by a sleeve extending from the gear 33. A spring pressed plunger engages the groove 45 near the edge of either shaft and prevents the accidental slipping off of the socket and handle.

A double arm handle 50 is mounted at the top of the post 20 and furnishes a convenient way of turning the base of the jack about the support 12 as a pivot. The keeper 52 is held in position on the post 20 by means of a set screw 53 and is mounted in such position that the square end 54 of the bail 55 just rides into place over the hook portion of the keeper. The bail 55 is pivoted direct to the support 12 as indicated at 56, which support is preferably in the form of a casting having a central perforation to receive the tube 14 and receiving standard pivoted casters 58 which may be secured to the support as by the bolts 59. In the preferred type as shown in Fig. 1 there are two casters 58 but this number is optional and a considerable number of jacks have been manufactured having but a single forward caster as shown in Fig. 4. For steadiness of operation, however, the two-caster support is preferred as that forms with the ground wheels 60 of the rear truck 11 a four-wheel base.

The elevating screw 62 is approximately two inches in diameter and is of the usual high carbon steel with a four pitch acme thread in order that it may stand the greatest possible weight that could ever be imposed upon it with a large factor of safety. This lifting screw 62 is held against rotation with respect to the truck 11 and is engaged by the nut 64 which is held against axial movement in any preferred manner and is provided on its periphery with beveled teeth 65 meshing with a bevel pinion 66 on the main shaft 67 the far or front end of which carries a sprocket wheel 68 engaging the previously mentioned chain 37.

An auxiliary screw 70 carrying a malleable steel screw plate 71 is fitted to the main elevating screw 62 and telescopes within the same, relative movement being manually accomplished. There is no need to lock the screws 62 and 70 together as there is no tendency of any kind for the screws 70 to rotate with respect to the non-rotatable lifting screw 62. The screw plate 71 is cupped slightly to enable it to receive a differential casing and is provided with four upstanding lugs 72 to provide for clearance of the various bracing rods that are used on different types of automobiles.

The operation of the device is extremely simple. If the automobile is readily accessible from all sides the jack may be pushed into approximately proper place and then by a slight pressure forward and backward on the handle 50 the jack is tilted about the casters 58 so as to elevate the wheels 60 from the ground. By now steering the jack by means of the two arms of the handle 50 the elevating screw plate may be brought into exactly the position desired. It will be noted that by means of the handle 50 the jack may be pushed or pulled or turned and the same is equally true of the bail 55. When the bail is brought down into engagement with the shoulders on the support 12 it will be at an angle of approximately 40° with the ground and the end 54 of the bail will be at a convenient height for the operator to tilt the jack or to shift it as well as to push or pull it into position.

If the distance from the ground to the point of engagement is considerable the auxiliary screw 70 may be turned by hand to extend the screw an additional distance usually about five inches. Particular attention is invited to the fact that with these telescoping screws arranged in the manner described there are no balls or springs or any delicate part whatsoever, the entire arrangement being sturdy and absolutely foolproof.

With the screw in proper position the handle 40 is adjusted in the socket 41 for small or large leverage as may be desired and the socket 41 is placed on shaft 30 for engagement with the sprocket wheel 35 to give the lower speed or the socket may be placed on the shaft 31 which will increase the speed twice, the chosen speed ratios being 500 to 1 and 1000 to 1 the more powerful leverage permitting the raising of the heaviest car by a pressure of only a few pounds on the handle 40 also at its greatest leverage.

The length of the steel tubing 14 is such that when the jack is in extreme crosswise position the post will clear the spare tires, bumpers, etc., on the automobile. The use of roller or ball bearings is a matter of choice, and while invariably furnished with the equipment illustrated may be omitted if desired. The provision of the high grade ball thrust bearing under the bevel gear upon which the weight of the car rests greatly increases the efficiency of the jack by the elimination of friction, and the use of roller bearings in the rear wheels 60 and ball bearings on the casters 58 materially add to the convenience in handling the jack.

In the modification shown in Fig. 4 the casting 24 is replaced by a yoke 75 welded or otherwise secured to the horizontal tubing 14 and the vertical post 20. This yoke has rearwardly extending lugs perforated to pivotally support the bail 55 and to provide a shoulder preventing the bail from approaching the ground at an angle less than 30° to 40°. While the bail in this modification is pivoted to the yoke instead of to the support the operation is identical. In this modification also, the support 12 is replaced by a considerably smaller support $12^a$ supporting a single caster $58^a$.

What I claim is:

1. In a jack, a lifting screw, a horizontally disposed shaft for operating said screw, a vertical post, hand operated means on said post located at a convenient height for the operator, and a flexible connection between said hand operated means and said shaft.

2. In a jack, a lifting screw, and a two-speed means for operating said screw, said means including a pair of parallel shafts one located close to the ground and the other at a convenient height for manual operation.

3. In a portable jack, a wheeled truck, a lifting screw carried thereby, an L-shaped frame secured to said truck and having an independent wheeled support adjustable to and from said truck, and gearing carried by said frame for raising and lowering said screw.

4. In a portable jack, a wheeled base, elevating means thereon, a horizontal frame member secured to said base, a post secured to said frame member and a wheeled support carried by said frame member between its points of attachment with said base and post so that said base may be raised from the ground by movement of the post about said support as a fulcrum.

5. In a portable automobile jack, a wheeled truck, an elevating screw thereon, an extension carried by said truck to form with same a base, a supporting wheel carried by said extension, and means carried by said extension to one side of said wheels so that said base may be moved about said wheel as a pivot while the wheels of the truck are raised from the ground.

6. In a portable automobile jack, a base having a truck at one end thereof and a second truck between the first mentioned truck and the free end of the base, and means for moving said base about the second mentioned truck as a pivot to raise said first mentioned truck.

7. In a portable automobile jack, a truck, elevating means carried by said truck, a wheeled support, a member extending from said truck and beyond said support and being secured to the latter, a bail pivoted to the free end of said member, and means for limiting the swing of said bail to an angle of less than 90°.

8. In an automobile jack, a four-wheel base, elevating means carried by said base, a horizontal shaft operatively connected to said elevating means, an upright rigidly secured to said base and gearing carried in part by said upright and in part by said base for operating said shaft.

9. In a portable automobile jack, a wheeled truck, an elevating screw mounted in said truck and restrained against rotation about its axis, a geared nut engaging said screw and restrained against axial movement, a wheeled support, means connecting said support and said truck to form a base, a post rising from said base and rigidly secured thereto, a plurality of gears rotatably mounted on said upright each operatively connected with said nut to rotate the same, and manually operated means for selectively engaging either of said gears to operate said lifting screw at a plurality of speeds.

ROBERT E. MANLEY.